(12) United States Patent
Brussk et al.

(10) Patent No.: US 9,162,317 B2
(45) Date of Patent: Oct. 20, 2015

(54) METHOD FOR THE WELDING PRODUCTION OF A LARGE-DIMENSIONED PART FROM DUCTILE IRON BY USING LASER-DEPOSITION-WELDED BUFFER MATERIALS AND ELECTRIC WELDING

(75) Inventors: Stefan Brussk, Mülheim an der Ruhr (DE); Birgit Grüger, Dortmund (DE); Michael Kretschmer, Shanghai (CN); Karsten Niepold, Mülheim (DE); Shilun Sheng, Oberhausen (DE); Claus Wilhelm, Krefeld (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 946 days.

(21) Appl. No.: 13/260,783

(22) PCT Filed: Mar. 31, 2010

(86) PCT No.: PCT/EP2010/054321
§ 371 (c)(1),
(2), (4) Date: Feb. 1, 2012

(87) PCT Pub. No.: WO2010/112552
PCT Pub. Date: Oct. 7, 2010

(65) Prior Publication Data
US 2012/0118860 A1   May 17, 2012

(30) Foreign Application Priority Data
Apr. 3, 2009   (EP) ..................................... 09004999

(51) Int. Cl.
*B23K 9/04*   (2006.01)
*B23K 15/00*   (2006.01)
(Continued)

(52) U.S. Cl.
CPC ......... *B23K 15/0073* (2013.01); *B23K 15/0093* (2013.01); *B23K 26/3206* (2013.01);
(Continued)

(58) Field of Classification Search
CPC ........... B23K 15/0073; B23K 15/0093; B23K 2201/001; B23K 2203/06; B23K 26/3206; B23K 26/345; B23K 28/00; C23C 24/103; C23C 24/106; C23C 28/02; C23C 28/023; F01D 25/24; F05D 2230/233; F05D 2230/30
USPC ................. 219/76.1, 121.11, 121.13, 121.14, 219/121.15, 121.6, 121.63, 121.64, 121.65; 428/544, 681, 638, 682, 683, 684; 148/525, 565; 228/101
See application file for complete search history.

(56) References Cited

U.S. PATENT DOCUMENTS 4,464,902 A    8/1984  Bandel
4,665,294 A *  5/1987  Hira et al. ................ 219/121.64
(Continued)

FOREIGN PATENT DOCUMENTS

EP    0221752 A2   5/1987
JP    2002113583 A   4/2002
(Continued)

*Primary Examiner* — Dana Ross
*Assistant Examiner* — Joseph Iskra

(57) ABSTRACT

A method for producing a part from ductile iron, including the steps of designing the part in such a way that the part is composed of a plurality of part components, producing the part components from ductile iron, providing the part components in pairs, depositing buffer material onto the rim edge of the first part component and onto the rim edge of the second part component by means of deposition welding, laying the second part component with the rim section thereof on the rim section of the first part component so that the rim edges lie against each other with the buffer materials thereof, and welding the rim sections, wherein the buffer material is selected in such a way that a structure change in the ductile iron material of the part components is prevented when the rim sections are welded.

3 Claims, 2 Drawing Sheets

(51) Int. Cl.
  B23K 28/00     (2006.01)
  C23C 24/10     (2006.01)
  C23C 28/02     (2006.01)
  F01D 25/24     (2006.01)
  B23K 26/32     (2014.01)
  B23K 26/34     (2014.01)
  B23K 35/30     (2006.01)
  B23K 35/02     (2006.01)

(52) U.S. Cl.
  CPC ........... *B23K26/345* (2013.01); *B23K 28/00* (2013.01); *B23K 35/0244* (2013.01); *B23K 35/0255* (2013.01); *B23K 35/3033* (2013.01); *C23C 24/103* (2013.01); *C23C 24/106* (2013.01); *C23C 28/02* (2013.01); *C23C 28/023* (2013.01); *F01D 25/24* (2013.01); *B23K 2201/001* (2013.01); *B23K 2203/06* (2013.01); *F05D 2230/233* (2013.01); *F05D 2230/30* (2013.01)

(56) References Cited

U.S. PATENT DOCUMENTS

| | | | | |
|---|---|---|---|---|
| 4,790,473 | A * | 12/1988 | Narasimhan et al. | 228/206 |
| 6,335,512 | B1 * | 1/2002 | Warren et al. | 219/137 WM |
| 6,589,671 | B1 * | 7/2003 | Kehrer | 428/683 |
| 2008/0220308 | A1 * | 9/2008 | Kanbe et al. | 429/30 |
| 2010/0310364 | A1 * | 12/2010 | Botsch et al. | 415/212.1 |

FOREIGN PATENT DOCUMENTS

| | | |
|---|---|---|
| RU | 2003124705 A | 2/2005 |
| RU | 2257984 C2 | 8/2005 |

* cited by examiner

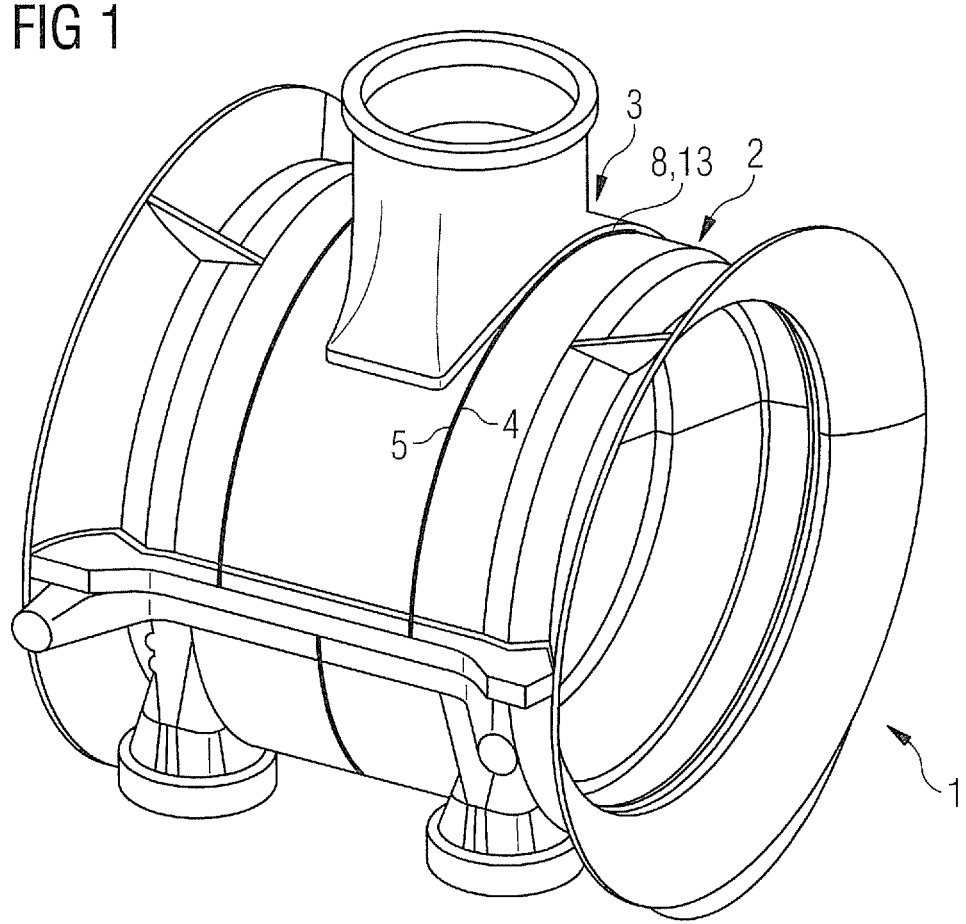

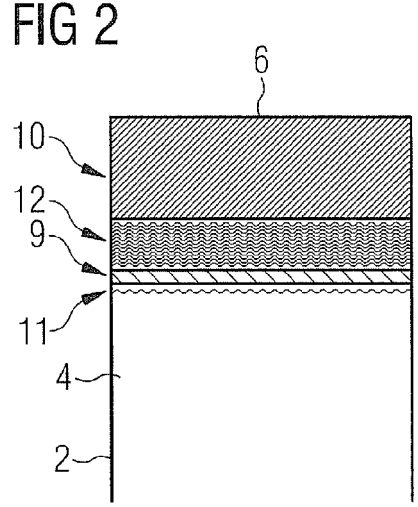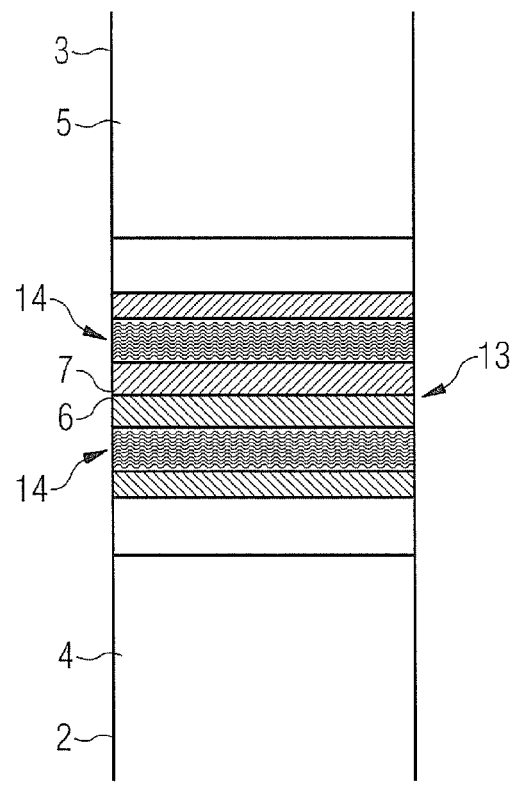

METHOD FOR THE WELDING PRODUCTION OF A LARGE-DIMENSIONED PART FROM DUCTILE IRON BY USING LASER-DEPOSITION-WELDED BUFFER MATERIALS AND ELECTRIC WELDING

CROSS REFERENCE TO RELATED APPLICATIONS

This application is the US National Stage of International Application No. PCT/EP2010/054321, filed Mar. 31, 2010 and claims the benefit thereof. The International Application claims the benefits of European Patent Office application No. 09004999.0 EP filed Apr. 3, 2009. All of the applications are incorporated by reference herein in their entirety.

FIELD OF INVENTION

The invention relates to a method for the production of a large-dimensioned part from ductile iron.

BACKGROUND OF INVENTION

Ductile iron is a cast iron comprising spheroidal graphite, with which large-dimensioned parts can be mass-produced economically. For example, the housing of a steam turbine is conventionally manufactured from ductile iron. The geometrical dimensions of a steam turbine in the upper power range, as are used for example for generating electricity in steam power plants, are however so large that problems can occur when casting ductile iron. For example, there is a high likelihood that nonuniformities and defects will occur in such a steam turbine housing, which compromise the strength of the steam turbine housing. Depending on the position in the part and the function of the positions affected, these nonuniformities and defects may be intolerable. There is therefore an upper limit on the maximum permissible size of housing parts made of ductile iron. A remedy would be provided by a housing part which is composed of a plurality of small pieces that are not critical in terms of casting technology. A prerequisite for this, however, would be that these pieces can form a housing when welded together. The pieces would need to be connected to one another by means of large-area welded connections, for which a suitable welding method would be necessary. However, no manufacturing method is known by which these types of large-area welded connections of ductile iron can be produced.

In general, nonuniformities and defects always occur in cast parts produced from ductile iron. The size and position of the nonuniformities and defects dictate whether the cast part in question must be discarded as a reject. For small local defects, repair welding methods are known. Such a repair welding method is, for example, cold welding with an iron-nickel alloy. However, the cold welding method produces a welded connection whose strength is less than the strength of the ductile iron. The cold welding method is therefore unsuitable for large-area welded connections. Another method is hot welding, although this can only be carried out by preheating of the part in the range of from 500° C. to 600° C., and subsequent heat re-treatment. Hot welding is therefore very complicated and generates distortion of the part, so that hot welding is unsuitable for large-area connection welding of ductile iron.

SUMMARY OF INVENTION

It is an object of the invention to provide a method for producing a part from ductile iron, the part having large dimensions but nevertheless a high strength.

The method according to the invention for producing a part from ductile iron comprises the steps: designing the part in such a way that the part is composed of a plurality of part components, which are placed on one another while forming partial joints and are dimensioned and configured so that they can be cast from ductile iron without critical defects in their material; producing the part components from ductile iron; providing the part components in pairs, a first of the part components and a second of the part components being intended for contiguous placement in which one of the partial joints is formed by a rim edge of a rim section of the first part component and a rim edge of a rim section of the second part component; depositing buffer material onto the rim edge of the first part component and onto the rim edge of the second part component by deposition welding; placing the second part component with its rim section onto the rim section of the first part component so that the rim edges lie on one another with their buffer materials; welding the rim sections so that the partial joint formed by the rim sections is welded and the first and second part components are thereby fastened to one another so that the first and second part components at least partially form the part; wherein the buffer material is selected so that a structural modification in the ductile iron material of the part components is prevented during the welding of the rim sections.

The part is therefore formed from the plurality of part components, unacceptable irregularities and defects in the ductile iron being prevented in the part components. For the design of the part, in principle no upper limit is therefore placed on the strength of the part owing to the use of ductile iron. Structural modification is intended in particular to mean hardening in the thermal influence zone and destruction of the basic material matrix by strong input of heat.

According to the invention, the part components are combined in a two-stage welding process, the buffer material first being deposited onto the rim edges prepared as weld bead flanks. The buffer material has a high nickel content and is adapted to the ductile iron and to the method for welding the rim sections. A large-area connecting weld of the ductile iron parts is made possible by the two-stage process. This welded connection has mechanical properties which are advantageously similar to those of the ductile iron. The part can therefore be designed with large dimensions, the part being constructed from small part components which are not critical in terms of casting technology. The likelihood of unacceptable irregularities and defects in the part is therefore low, and production of the large-dimensioned part is made possible.

The method according to the invention may furthermore be used for repairing the part, by separating a damaged section from the part and replacing it with a new section. The new section is welded into the existing part by using the method according to the invention.

The buffer material is preferably deposited containing nickel and/or in a plurality of layers. This creates a tempering effect of the layer respectively deposited previously or the thermal influence zone in the material of the part component. A laser powder deposition welding method is preferably used for the deposition welding. It is particularly preferable that a laser powder deposition welding method is used for the deposition welding of the buffer material onto the first part component and a low-energy shield gas welding method is used for the deposition welding of the buffer material onto the second part component, in such a way that no thermal influence zone is formed on the rim sections. In this way, the buffer material can be deposited onto the part components with a minimal effect on the material of the part components, as a result of which advantageous mechanical properties are achieved in the thermal influence zone of the deposition welding of the powder material.

During the welding of the rim sections, it is preferable to use a welding method having a high welding depth and a narrow welding pool, and a small thermal influence zone. The welding method is an electron beam welding method. The thickness of the powder material and the parameters of the electron beam welding method and of the laser powder deposition welding method are selected so that the thermal influence zone of the welding by the electron beam welding method is arranged in the buffer material.

BRIEF DESCRIPTION OF THE DRAWINGS

A preferred embodiment of a part produced by the method according to the invention will be explained below with the aid of the appended schematic drawings, in which:

FIG. 1 shows a perspective view of an embodiment according to the invention of the part, FIG. 2 shows a cross section through a rim section of a first part component of the part after a first production step and FIG. 3 shows a cross section of the rim sections of the first part component and of a second part component of the part after a second production step.

DETAILED DESCRIPTION OF INVENTION

As can be seen in FIG. 1, a part is shown as a steam turbine low-pressure inner housing 1. The housing 1 is composed of a plurality of part components, in particular a first part component 2 and a second part component 3. The part components 2, 3 are placed on one another and form a partial joint 8. The part components 2, 3 are furthermore dimensioned and configured so that they can be cast from ductile iron without critical defects in their material.

The first part component 2 comprises a rim section 4, which is arranged immediately next to a rim section 5 of the second part component 3. The rim section 4 of the first part component 2 is delimited by a rim edge 6 which bears flush on a rim edge 7 that delimits the rim section 5 of the second part component 3. The partial joint 8 is thereby formed by the rim edges 6, 7.

During production of the housing 1, the first part component 2 and the second part component 3 are produced separately from ductile iron in a ductile iron casting method. In this case, there is a small risk that critical defects will be formed in the part components 2, 3.

In a first manufacturing step, the first part component 2 is provided. A first powder material layer 9 is deposited onto its rim edge 6 by a laser powder deposition welding method. A second powder material layer 10 is subsequently deposited onto the first powder material layer 9 by the laser powder deposition welding method. The thermal influence zone 11 of the first powder material layer 9 is arranged in the rim section 4 of the first part component 2. The thermal influence zone 12 of the second powder material layer 10 is arranged in the first powder material layer 9. The rim edge 7 of the rim section 5 of the second part component 3 is, like the rim edge 6, provided with a first powder material layer 9 and a second powder material layer 10. In a second manufacturing step, the part components 2 and 3 are placed on one another with their rim sections 4 and 5 so that the partial joint 8 is formed. The partial joint 8 is welded by an electron beam weld bead 13, the thermal influence zones 14 of the electron beam weld bead 13 being arranged in the buffer material layers.

The invention claimed is:

1. A method for the production of a part from ductile iron, comprising:

designing the part so that the part comprises a first part component and a second part component, which are placed on one another while forming a partial joint and are dimensioned and configured so that they are cast from ductile iron without critical defects in a material of the first part component and the second part component;

producing the first part component and the second part component from ductile iron;

providing the first part component and the second part component in a pair, the first part component and the second part component being intended for contiguous placement in which the partial joint is formed by a first rim edge of a first rim section of the first part component and a second rim edge of a second rim section of the second part component;

depositing a first buffer material onto the first rim edge of the first part component and a second buffer material onto the rim edge of the second part component by deposition welding;

placing the second part component with the second rim section onto the first rim section of the first part component so that the first and second rim edges lie on one another with the first and second buffer material; and welding by an electron beam welding method the first and second rim sections so that the partial joint formed by the first and second rim sections is welded and the first and second part components are thereby fastened to one another, as a result of which the first and second part components at least partially form the part, wherein the first and second buffer materials are selected so that a structural modification in the ductile iron material of the first and part components is prevented during the welding of the first and second rim sections, wherein a laser powder deposition welding method is used for the deposition welding, wherein a thickness of the powder material and the parameters of the electron beam welding method and of the laser powder deposition welding method are selected so that a thermal influence zone of the welding by the electron beam welding method is arranged only in the first and second buffer materials.

2. The method as claimed in claim 1, wherein the first and second buffer material is deposited comprising nickel and in a plurality of layers.

3. The method as claimed in claim 1, wherein the first and second buffer material is deposited comprising nickel or in a plurality of layers.

* * * * *